United States Patent
Sun et al.

(10) Patent No.: US 10,683,412 B2
(45) Date of Patent: Jun. 16, 2020

(54) DRAG REDUCING COMPOSITION

(71) Applicants: LIQUIDPOWER SPECIALTY PRODUCTS, INC., Houston, TX (US); MICRO POWDERS, INC., Tarrytown, NY (US)

(72) Inventors: Lu Sun, Stillwater, OK (US); Michael L. Olechnowicz, Ponca City, OK (US); Ray L. Johnston, Ponca City, OK (US); Thomas D. Lane, Ponca City, OK (US); Richard J. Czarnecki, Wayne, NJ (US)

(73) Assignee: LIQUIDPOWER SPECIALTY PRODUCTS INC., Houston, TX (US)

( * ) Notice: Subject to any disclaimer, the term of this patent is extended or adjusted under 35 U.S.C. 154(b) by 0 days.

(21) Appl. No.: 15/667,210

(22) Filed: Aug. 2, 2017

(65) Prior Publication Data
US 2018/0037729 A1     Feb. 8, 2018

Related U.S. Application Data

(60) Provisional application No. 62/371,267, filed on Aug. 5, 2016.

(51) Int. Cl.
| | |
|---|---|
| C08F 36/08 | (2006.01) |
| C08L 23/02 | (2006.01) |
| C08L 23/18 | (2006.01) |
| C08L 25/02 | (2006.01) |
| C08L 47/00 | (2006.01) |
| C08L 93/04 | (2006.01) |
| F17D 1/17 | (2006.01) |

(52) U.S. Cl.
CPC .............. *C08L 23/18* (2013.01); *C08F 36/08* (2013.01); *C08L 23/02* (2013.01); *C08L 25/02* (2013.01); *C08L 47/00* (2013.01); *C08L 93/04* (2013.01); *F17D 1/17* (2013.01); *C08L 2203/18* (2013.01)

(58) Field of Classification Search
CPC .......... C08L 23/18; C08L 23/02; C08L 25/02; C08L 47/00; C08L 93/04; C08L 2203/18; C08F 36/08; F17D 1/17
See application file for complete search history.

(56) References Cited

U.S. PATENT DOCUMENTS

| | | | | |
|---|---|---|---|---|
| 3,933,941 A | * | 1/1976 | Yonemitsu | C08L 25/02 525/133 |
| 3,987,123 A | * | 10/1976 | Lepert | C08F 277/00 525/290 |
| 2002/0065352 A1 | * | 5/2002 | Johnston | C08J 3/005 524/487 |
| 2013/0203891 A1 | * | 8/2013 | Burden | C08K 5/05 523/175 |
| 2013/0333766 A1 | * | 12/2013 | Fan | F17D 1/17 137/13 |

FOREIGN PATENT DOCUMENTS

| | | |
|---|---|---|
| EP | 2757142 A1 | 7/2014 |
| WO | 02085960 A2 | 10/2002 |
| WO | 2011053359 A1 | 5/2011 |

OTHER PUBLICATIONS

International Search Report and Written Opinion dated Oct. 23, 2017 for Application No. PCT/US2017/045273.
GCC Patent Office; Examination Report for Application No. GC 2017-33798; dated Mar. 1, 2019; 3 total pages.
Office Action in related application EA 201990441 dated Dec. 20, 2019.

* cited by examiner

*Primary Examiner* — Patrick D Niland
(74) *Attorney, Agent, or Firm* — Patterson + Sheridan, LLP

(57) ABSTRACT

Embodiments of the present disclosure generally relate to a drag reducing suspension capable of dissolving in cold hydrocarbon fluids at usage level. In one embodiment, the drag reducing composition comprises a drag reducing polymer, a partitioning agent comprises a one or more of a coal-tar resin, a C5 aliphatic petroleum resin, a C9 aromatic petroleum resin, C5/C9 aliphatic/aromatic petroleum resin, a cycloaliphatic diene-based petroleum resin, a pure monomer resin, a terpene resin, a terpene phenol resin, a styrenated terpene resin, a rosin resin, a rosin resin derivative, one or more of an alkylphenol resin, a modified alkylphenol resin, and fully or partially hydrogenated form thereof, and suspending fluid medium. The partitioning agent has a good solubility (greater than 8 ppm) in a hydrocarbon stream, such as in a cold refined hydrocarbon stream, for example a diesel stream at a temperature of 0° C. or less.

23 Claims, No Drawings

DRAG REDUCING COMPOSITION

Embodiments of the present disclosure generally relate to a drag reducing composition, and more particularly, to a drag reducing suspension capable of dissolving in cold hydrocarbon fluids, such as cold refined hydrocarbon fluids, at usage level. Embodiments of the present disclosure further relate to methods of making the drag reducing composition.

BACKGROUND

A drag reducing agent is one that substantially reduces the friction loss that results from the turbulent flow of a fluid. Where fluids are transported over long distances, such as in oil and other hydrocarbon liquid pipelines, these friction losses result in inefficiencies that increase equipment and operations costs. Ultra-high molecular weight polymers are known to function well as drag reducing agents, particularly in hydrocarbon liquids. In general, drag reduction depends in part upon the molecular weight of the polymer additive and its ability to dissolve in the hydrocarbon under turbulent flow. Effective drag reducing polymers typically have ultra-high molecular weights in excess of five million.

One way to introduce the drag reducing polymers into the flowing hydrocarbon stream is by pumping of a drag reducing polymer suspension into the hydrocarbon stream. The ultra-high molecular weight polymers are suspended in a liquid that will not dissolve or will only partially dissolve the ultra-high molecular weight polymer. This suspension is then introduced into the flowing hydrocarbon stream. Inclusion of a partitioning agent is generally desirable in these suspensions as the drag reducing polymers, due to their soft and tacky nature, tend to agglomerate, or "cold flow", when their unaltered surfaces come into contact with one another. Conventional partitioning agents, such as fatty waxes, often have limited solubility, particularly in cold hydrocarbon fluids, such as cold refined hydrocarbon fluids, for example diesel. As a result, frequent filter plugging issues result owing to undissolved partitioning agent.

It would be desirable, then, to provide a drag reducing composition containing a partitioning agent having increased solubility, especially in cold hydrocarbon fluids.

SUMMARY

In one embodiment, a drag reducing composition includes a drag reducing polymer; a partitioning agent comprising a one or more of a coal-tar resin, a C5 aliphatic petroleum resin, a C9 aromatic petroleum resin, C5/C9 aliphatic/aromatic petroleum resin, a cycloaliphatic diene-based petroleum resin, a pure monomer resin, a terpene resin, a terpene phenol resin, a styrenated terpene resin, a rosin resin, a rosin resin derivative, one or more of an alkylphenol resin, a modified alkylphenol resin, and fully or partially hydrogenated form thereof; and a suspending fluid medium.

A drag reducing composition, comprising a drag reducing polymer; a partitioning agent, wherein the partitioning agent has a solubility of greater than 8 ppm in a hydrocarbon stream at a temperature of 0° C. or less; and a suspending fluid medium.

A method of making a drag reducing composition includes forming a solid drag reducing polymer; dividing the solid drag reducing polymer in the presence of a partitioning agent so the polymer particles are in contact with the partitioning agent, wherein the partitioning agent comprises one or more of a coal-tar resin, a C5 aliphatic petroleum resin, a C9 aromatic petroleum resin, C5/C9 aliphatic/aromatic petroleum resin, a cycloaliphatic diene-based petroleum resin, a pure monomer resin, a terpene resin, a terpene phenol resin, a styrenated terpene resin, a rosin resin, a rosin resin derivative, one or more of an alkylphenol resin, a modified alkylphenol resin, and fully or partially hydrogenated form thereof; and dispersing the polymer particles and the partitioning agent in a carrier fluid.

DETAILED DESCRIPTION

Various preferred features and embodiments will be described below by way of non-limiting illustration.

In one embodiment, the drag reducing polymer is an ultra-high molecular weight polymer that is typically a linear poly($\alpha$-olefin) composed of monomers with a carbon chain length of between two and twenty carbons or mixtures of two or more such linear poly($\alpha$-olefins). In some embodiments, the linear poly($\alpha$-olefins) include, but are not limited to, poly(1-octene), poly(1-nonene) and poly(1-decene). In one embodiment, the ultra-high molecular weight polymer is a copolymer, i.e., a polymer composed of two or more different types of monomers, as long as all monomers used have a carbon chain length of between two and twenty carbons. Other polymers of a generally similar nature that are soluble in the liquid hydrocarbon will also function in the invention. Thus, it will be understood that although reference is made to polyalpha-olefins, other polymers known to reduce drag or friction in hydrocarbons, and other polymers in general may be used in the compositions and methods of the disclosure. In one embodiment, the drag reducing polymer includes methacrylate.

In one embodiment, the drag reducing composition is formed through bulk polymerization. In some embodiments, other polymerization methods are acceptable, including but not limited to solution polymerization. When produced through bulk polymerization, the polymerization medium primarily contains a catalyst and monomers, such as alpha-olefin monomers. In some embodiments, a diluent hydrocarbon can be present.

The bulk polymerization may be carried out using any polymerization catalyst, and in some embodiments, can be Ziegler-Natta catalysts. The Ziegler-Natta catalysts used can be any of those described in the art. In some embodiments, useful materials are those described in U.S. Pat. Nos. 4,358,572; 4,415,714; 4,493,903; and 4,493,904, which are incorporated by reference. Appropriate metallocene catalysts may also be used. In bulk polymerization systems, catalysts are typically used at a concentration of 3500 moles monomer per mole transition metal halide in the catalyst, although ratios can vary from as low as 500:1 to as high as 10000:1 or more. Catalyst concentration affects rate of reaction and temperature as well as molecular weight. These catalysts often are more effective when used in the presence of a promoter, such as dibutyl ether, or a co-catalyst, such as diethyl aluminum chloride (DEAC).

For polymerization reactions that are incomplete, removal of unreacted monomers is advantageous and may be carried out by vacuum drying and/or vacuum drying with precipitation according to techniques known to those skilled in the art. However, a bulk reaction can be carried out to substantial completion, for example, 99% completion or more, and the drying step to remove monomer and/or solvent avoided if possible.

In one embodiment, the drag reducing polymer can be made by solution polymerization of the monomers followed by removal of the solvent. In solution polymerization, the hydrocarbon solvent, catalyst, and monomers are combined in a reacting vessel and agitated under a nitrogen atmosphere at ambient pressure. It may be necessary to cool the reaction vessel prior to the reaction or during the reaction, depending on the equipment used, conversion desired, and concerns over polymeric degradation. As the solution becomes viscous, the agitation is discontinued and the reaction is allowed to proceed to greater than 50% conversion, or greater than 95% conversion, or even greater than 99% conversion. After the completion of the polymerization, the polymer solution may be contacted with a non-solvent to precipitate the polymer and extract the polymerization solvent and unreacted monomer, as is taught in U.S. Pat. No. 5,376,697. Alternatively, if the hydrocarbon solvent boils at a low temperature, it can be removed by heating, exposure to vacuum, or both. Combinations of extraction by a non-solvent, heating and/or vacuum may be used, as apparent to one skilled in the art.

In one embodiment, the drag reducing polymer has a molecular weight in excess of five million.

In one embodiment, bulk or solution polymerization is followed by granulation and/or grinding to produce a particulate polymer composition, such as polymer particles. The granulation and/or grinding may be conducted at cryogenic or non-cryogenic temperatures. In one embodiment, the granulation and/or grinding occurs at temperatures below the glass transition temperature of the polymer and then mixed in a carrier fluid. Glass transition temperatures vary with the type of polymer and generally range between −10° C. to −100° C. This temperature may vary depending on the glass transition point of the particular polymer or copolymer, but normally such temperatures are below the lowest glass transition point of a polymer that comprises a polymer blend. In a further embodiment, grinding for production of the polymer particles may be conducted at ambient temperature. However, it is preferable to cool the drag reducing polymer to between 5° C. and 15° C. when grinding the drag reducing polymer. Cooling may be accomplished either internally or externally, or both, with a liquid, gaseous, or solid refrigerant, or a combination thereof. In one embodiment, the drag reducing polymer may be cooled by spraying a liquid refrigerant, such as liquid nitrogen, liquid helium liquid argon, or a mixture of two or more such refrigerants.

Granulation and/or grinding of the drag reducing polymer to form polymer particles will be performed in the presence of a partitioning agent, which is added to prevent the freshly exposed surfaces of the polymer particles from sticking together. A small amount, typically less than 5% and preferably less than 4% by weight of the total mixture, of the partitioning agent, may be added during the granulation process in order to prevent agglomeration of the small polymer particles. In one embodiment, polymer particles are in contact with the partitioning agent, which prevents polymer particles from sticking to each other. The polymer particles may be at least partially coated, fully coated, or dusted with the partitioning agent. A sufficient amount of the partitioning agents are in contact with the polymer particles to prevent agglomeration of the polymer particles.

The partitioning agent includes hydrocarbon resins that are low molecular weight thermoplastic polymer synthesized via the thermal or catalytic polymerization of coal-tar fractions, cracked petroleum distillates, terpenes or pure olefinic monomers. These hydrocarbon resins can range from brittle solids to viscous liquids. The hydrocarbon resins have a softening point above about 30° C. The synthetic polymeric resins derived from variable mixtures of monomers: byproducts of coal coking process (such as cyclopentadiene, dicyclopentadiene, styrene, methylstyrene, coumarone, 2-methylcoumarone indene, 2-methylindene); cracked petroleum distillates (including aliphatic C5-C6 paraffins, olefins and diolefins, cycloaliphatic diene, and C9 aromatic freestreams); pure monomers (such as styrene, alkyl-substituted styrenes and isobutylene); naturally occurred terpenes (such as α-pinene, β-pinene, limonene). It is known that these mixed monomers can undergo polymerization by cationic initiation to form hydrocarbon resins. Examples of such hydrocarbon resins include C5 aliphatic petroleum resins produced mainly from C5 fraction byproduct in the steam cracking of petroleum; C9 aromatic petroleum resins produced mainly from C9 fraction; and C5/C9 copolymer resins obtained by copolymerizing the above-mentioned C5 fraction with C9 fraction, resins from cyclopentadiene and dicyclopentadiene, coal-tar resins, terpene resins, pure monomer resins (resins made from above mentioned feedstocks that have been highly purified), and fully or partially hydrogenated form of above resins. In one embodiment, the terpene resins include terpene phenol resins and styrenated terpene resins.

In one embodiment, the partitioning agent includes one or more of a coal-tar resin, a C5 aliphatic petroleum resin, a C9 aromatic petroleum resin, C5/C9 aliphatic/aromatic petroleum resin, a cycloaliphatic diene-based petroleum resin, a pure monomer resin, a terpene resin, a terpene phenol resin, a styrenated terpene resin, a rosin resin, a rosin resin derivative, one or more of an alkylphenol resin, a modified alkylphenol resin, and fully or partially hydrogenated form thereof.

In one embodiment, the partitioning agent is a hydrocarbon resin including one or more of a coal-tar resin, a C5 aliphatic petroleum resin, a C9 aromatic petroleum resin, C5/C9 aliphatic/aromatic petroleum resin, a cycloaliphatic diene-based petroleum resin, a pure monomer resin, a terpene resin, a terpene phenol resin, a styrenated terpene resin, and fully or partially hydrogenated form thereof.

In one embodiment, the partitioning agent is an alkylphenol resin, such as an alkylphenol-aldehyde resin, an alkylphenol-acetylene resin or a modified alkylphenol resin, such as xylene modified alkylphenol resin.

In one embodiment, the partitioning agent is a rosin resin, such as those derived from pines or other plants. In one embodiment, the rosin resins can include those that have been chemically modified to improve their physical or chemical properties (derivatives). Such modifications may alter softening point, color, acid number, stability, solubility or other chemical and physical characteristics. Examples of suitable derivative modifications include esterification, disproportionation and hydrogenation, dimerization and the like.

There is no particular limitation with respect to the type of the resin so long as the resin has solubility greater than 8 ppm in a hydrocarbon at a temperature of 0° C. or less. In one embodiment, the hydrocarbon resins will have a softening point of at least 35° C. In one embodiment, the hydrocarbon resin will have a softening point of from about 35° C. to about 170° C. In one embodiment, the hydrocarbon resin has a softening point of 100° C. or higher, such as from 100° C. to 150° C. Examples of commercially available resins suitable for use as partitioning agent include hydrocarbon resins from Resinall Corp (such as R-1030, R-261, R-263, and R-743), Eastman Chemical Company (such as Eastotac H-130R, H-130E, Kristalex 5140, Plastolyn 290), and Neville Chemical Company (such as Nevchem 220, Nevroz 1420, LX-1035, and LX-2161).

In some embodiments, it has been surprisingly discovered that a tackifier can be used as the partitioning agent. Tackifiers are compounds used in formulating adhesives to increase the stickiness of the surface of the adhesive or compounds used to adjust tack in ink applications. Because tackifiers have good solubility in hydrocarbon streams, such as refined hydrocarbon streams, for example a diesel stream, at a low temperature, and the freshly exposed surfaces of the drag reducing polymer particles are stickier than surfaces of a tackifier, tackifiers can function as partitioning agents in the drag reducing composition. The partitioning agent including a tackifier will dissolve in a hydrocarbon stream, such as a refined hydrocarbon stream, for example a diesel stream, at a low temperature, such as 0° C. or less, for example −12° C. or less, and problems such as plugged filters are eliminated as a result.

In one embodiment, the partitioning agent includes resins that are typically classified as tackifiers. For example, the tackifier may include one or more of a coal-tar resin, a C5 aliphatic petroleum resin, a C9 aromatic petroleum resin, C5/C9 aliphatic/aromatic petroleum resin, a cycloaliphatic diene-based petroleum resin, a pure monomer resin, a terpene resin, a terpene phenol resin, a styrenated terpene resin, a rosin resin, a rosin resin derivative, one or more of an alkylphenol resin, a modified alkylphenol resin, and fully or partially hydrogenated form thereof.

In another embodiment, the partitioning agent is a tackifier that includes an alkylphenol resin, such as an alkylphenol-aldehyde resin, an alkylphenol-acetylene resin or a modified alkylphenol resin such as xylene modified alkylphenol resin.

In another embodiment, the partitioning agent is a tackifier that includes a rosin resin, such as those derived from pines or other plants. In one embodiment, the rosin resins can include those that have been chemically modified to improve their physical or chemical properties (derivatives). Such modifications may alter softening point, color, acid number, stability, solubility or other chemical and physical characteristics. Examples of suitable derivative modifications include esterification, disproportionation and hydrogenation, dimerization and the like.

The polymer particles with the partitioning agent formed following granulation can then be transported to a pre-cooler. The transport can be accomplished by any number of typical solids handling methods, including through the use of an auger or pneumatic transport system. The pre-cooler can be an enclosed screw conveyor with nozzles for spraying a liquid refrigerant, such as liquid nitrogen, liquid helium, liquid argon, or mixtures thereof, onto the polymer pieces. While a gaseous refrigerant may also be used alone, the cooling efficiency is often too low. The pre-cooler reduces the temperature of the polymer particles to a temperature below the glass transition temperature of the polymer. In one embodiment, this temperature is below −130° C., and in another embodiment, the temperature is below −150° C. These temperatures can be produced by any known methods, and in one embodiment includes use of liquid refrigerant such as liquid nitrogen, helium, argon, or a mixture of two or more such refrigerants sprayed directly onto the polymer, as the resulting atmosphere reduces or eliminates flammability hazards that exist when polymer particles are mixed with an oxygen-containing atmosphere. The rate of addition of the liquid refrigerant may be adjusted to maintain the polymer within the required temperature range.

Following cooling, the polymer particles with the partitioning agent are transported to a cryomill. A liquid refrigerant can be added to the cryomill in order to maintain the temperature of the polymer particles below the glass transition temperature of the ultra-high molecular weight polymer, such as between −130° C. and −150° C. The cryomill acts to reduce the particle size of the polymer particles it receives from the pre-cooler.

The polymer particles with the partitioning agent formed in the cryomill are then transferred to a separator where most of the liquid refrigerant vaporizes. The separator acts to separate the primarily vaporized refrigerant atmosphere from the solid polymer particles, and the larger polymer particles from the small polymer particles. Larger polymer particles having diameters higher than a set minimum diameter are discarded or returned for recycle purposes to the pre-cooler for regrinding.

The small polymer particles with the partitioning agent are then mixed with a carrier or suspending fluid to form a suspending fluid/polymer particle mixture. The suspending medium can include one or more of (a) alcohols containing less than 14 carbon atoms, (b) glycols containing less than 14 carbon atoms, and (c) glycol ethers. Suspensions can also be made with propylene glycol, di(propylene glycol) methyl ether, or tri(propylene glycol) methyl ether. It will be realized by those skilled in the art that various mixtures of these various carbon atom length alcohols, glycols and glycol ethers can be used to provide a "tailored" suspending medium for the particular polyolefin loading and service conditions. In particular, it should be noted that a particular mixture can vary depending upon basic concepts such as price, convenience or availability, as well as technical questions of stability, solubility, long-term storage, and compatibility with the flowing hydrocarbon.

Additional components may be added to the suspending fluid/polymer particle mixture before, during or after mixing the ground polymer particles with the suspending fluid in order to aid the formation of the suspension and/or to maintain the suspension. Such additional components include but are not limited to glycols, wetting agents, antifoaming agents, and the like.

Relative proportions of each suspension component, including drag reducing polymer, partitioning agent, suspension medium etc., will have an effect upon the final properties, including but not limited to stability to settling, separation and/or agglomeration, of the suspension. While a wide range of proportions may be employed according to the desirable properties of the final suspension, it has been found that, in certain embodiments, a ratio of drag reducing polymer to overall suspension ranging from about 10 to about 50 percent by weight is effective, while in other embodiments a ratio of drag reducing polymer to overall dispersion may range from about 25 to about 35 percent by weight. Where additional partitioning agent is to be included it may be, in certain non-limiting embodiments, in the range of from about 2 to about 30 percent by weight, as compared to the overall suspension.

INDUSTRIAL APPLICATION

The drag reducing composition described herein can be, in some embodiments, utilized for drag reduction in a variety of streams, such as hydrocarbons, including, for example, crude oil, heating oil, liquefied natural gas, jet fuel, kerosene, refined gas, gasoline and diesel fuel. In use, the suspension is generally added in a proportion, based on weight of the hydrocarbon stream, of from about 5 ppm to about 100 ppm, or from about 8 ppm to about 60 ppm.

The amount of each chemical component described is presented exclusive of any solvent, which may be customarily present in the commercial material, that is, on an active chemical basis, unless otherwise indicated. However, unless otherwise indicated, each chemical or composition referred to herein should be interpreted as being a commercial grade material which may contain the isomers, byproducts, derivatives, and other such materials which are normally understood to be present in the commercial grade.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present disclosure in its intended use, may not be susceptible of easy description. Nevertheless, all such modifications and reaction products are included within the scope of the present disclosure; the present disclosure encompasses the composition prepared by admixing the components described above.

EXAMPLES

The disclosure will be further illustrated by the following examples, which sets forth particularly advantageous embodiments. While the examples are provided to illustrate the present disclosure, they are not intended to limit it. Unless otherwise specified, weight percents (wt. %) are given in wt. % based on the weight of the total composition.

Materials

The materials are generally commercially available from chemical supply houses known to those skilled in the chemical arts or from the supplier indicated below. Resinall Corp (Severn, N.C.), Eastman Chemical Company (Kingsport, Tenn.), and Neville Chemical Company (Pittsburgh, Pa.).

Bottle samples of diesel (50 gram samples) were placed in one of three temperature controlled environments:

1) Lab benchtop (70° F.)
2) Ice water bath (32° F.)
3) Water/ethanol/dry ice bath (10° F.)

The samples were allowed to remain in these environments until they reached the environment temperature. At that point, a small amount of partitioning agent powder (30-micron particle size) was added to each diesel sample by quickly removing the bottle from the environment, removing the bottle cap, adding the powder via small spatula, recapping the bottle, and placing the bottle back into its environment. The treated sample bottles were periodically shaken (about every 15 minutes) while still in the environment and were allowed to remain in the environment for 4 hours.

After 4 hours, the samples were removed from their environment and immediately passed through 1-micron track-etched filters to remove any non-dissolved particles of the partitioning agent. The filtrate, in each instance, was obtained and tested via GPC (gel permeation chromatography) methods to determine the amount of the partitioning agent that was in solution and passed through the filter.

| Fuel Sample | Environment Temperature (° F.) | Partitioning agent amount added to fuel (ppm) | Partitioning agent amount detected in fuel after filtration (ppm) |
| --- | --- | --- | --- |
| Diesel | 70 | 5400 | 5900 |
| Diesel | 32 | 3200 | 3400 |
| Diesel | 10 | 3400 | 3300 |
| Diesel | 10 | 10000 | 10100 |
| Renewable Diesel | 10 | 10000 | 10100 |

The initial targeted amounts of partitioning agent were 5000 ppm in the room temperature diesel and 3000 ppm in the cold diesel. The lower targeted ppm levels in the cold diesel were in anticipation of lower solubility. Initial results showed complete solubility at the levels tested. Tests were then repeated at 10° F. with much higher concentration and included a renewable diesel to make sure there was no impact of the diesel containing some amount of renewable material (fatty acid derivatives). The renewable diesel contained approximately 30% renewable content.

The disclosed technology provides a drag reducing composition having a resin based partitioning agent. The partitioning agent displays acceptable solubility characteristics even in cold hydrocarbon temperatures, for example, of 0° C. or less.

The disclosed technology provides a drag reducing composition including a drag reducing polymer, a partitioning agent comprising one or more of a coal-tar resin, a C5 aliphatic petroleum resin, a C9 aromatic petroleum resin, C5/C9 aliphatic/aromatic petroleum resin, a cycloaliphatic diene-based petroleum resin, a pure monomer resin, a terpene resin, a terpene phenol resin, a styrenated terpene resin, a rosin resin, a rosin resin derivative, one or more of an alkylphenol resin, a modified alkylphenol resin, and fully or partially hydrogenated form thereof, and a suspending fluid medium.

The disclosed technology further provides a drag reducing composition in which the drag reducing polymer is a polyalphaolefin drag reducing polymer comprising olefins containing from 2 to 40 carbon atoms.

The disclosed technology further provides a drag reducing composition in which the partitioning agent is a tackifier.

The disclosed technology further provides a drag reducing composition in which the partitioning agent comprises monomers containing from 5 to 10 carbon atoms.

The disclosed technology further provides a drag reducing composition in which the partitioning agent has a softening temperature of from about 30° C. to about 170° C.

The disclosed technology further provides a drag reducing composition in which the partitioning agent comprises an alkylphenol resin comprising one or more of an alkylphenol-aldehyde resin, an alkylphenol-acetylene resin, or a modified alkylphenol resin.

The disclosed technology further provides a drag reducing composition in which the partitioning agent comprises a natural resin comprising gum rosin, wood rosin, and tall oil rosin.

The disclosed technology further provides a drag reducing composition in which the partitioning agent comprises a natural resin derivative that is modified by one or more of esterification, hydrogenation, dimerization or functionalization.

The disclosed technology further provides a drag reducing composition in which further includes a carrier fluid.

The disclosed technology further provides a drag reducing composition in which the carrier fluid includes an alcohol or water.

The disclosed technology further provides a drag reducing composition in which the alcohol comprises a glycol.

The disclosed technology further provides a drag reducing composition in which the partitioning agent has solubility greater than 8 ppm in a hydrocarbon at a temperature of −12° C. or less.

The disclosed technology further provides a drag reducing composition in which the polyalphaolefin drag reducing polymer comprises an olefin containing from about 2 to about 40 carbon atoms.

The disclosed technology further provides a method of making a drag reducing composition, including forming a solid hydrocarbon soluble drag reducing polymer; dividing the solid drag reducing polymer in the presence of a partitioning agent comprising one or more of a coal-tar resin, a C5 aliphatic petroleum resin, a C9 aromatic petroleum resin, C5/C9 aliphatic/aromatic petroleum resin, a cycloaliphatic diene-based petroleum resin, a pure monomer resin, a terpene resin, a terpene phenol resin, a styrenated terpene resin, a rosin resin, a rosin resin derivative, one or more of an alkylphenol resin, a modified alkylphenol resin, and fully or partially hydrogenated form thereof to form polymer particles, and dispersing the polymer particles in a carrier fluid.

The disclosed technology further provides a method in which forming the solid hydrocarbon soluble drag reducing polymer includes bulk polymerization or solution polymerization.

The disclosed technology further provides a method in which the partitioning agent comprises a tackifier.

The disclosed technology further provides a method in which the partitioning agent includes monomers containing from 5 to 10 carbon atoms.

The disclosed technology further provides a method in which the partitioning agent has a softening point of from about 30° C. to about 170° C.

The disclosed technology further provides a method in which the partitioning agent is a rosin resin that comprises gum rosin, wood rosin, a tall oil rosin or a rosin resin derivative.

The disclosed technology further provides a method in which the partitioning agent is a rosin resin derivative that is modified by one of esterification, disproportionation and hydrogenation, or dimerization.

The disclosed technology further provides a method in which the suspending fluid medium comprises water or an alcohol.

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration.

What is claimed is:

1. A drag reducing composition, comprising:
   a drag reducing polymer;
   a partitioning agent comprising a tackifier, wherein the tackifier is a hydrocarbon resin comprising one or more of a coal-tar resin, a C5 aliphatic petroleum resin, a C9 aromatic petroleum resin, a C5/C9 aliphatic/aromatic petroleum resin, a cycloaliphatic diene-based petroleum resin, or fully or partially hydrogenated form thereof; and
   a suspending fluid medium.

2. The composition of claim 1, wherein the drag reducing polymer comprises polyalphaolefin having olefins containing from 2 to 40 carbon atoms.

3. The composition of claim 1, wherein the hydrocarbon resin comprises monomers containing from 5 to 10 carbon atoms.

4. A drag reducing composition, comprising:
   a drag reducing polymer;
   a partitioning agent, comprising:
      a tackifier; and
      one or more of a C5 aliphatic petroleum resin, a C9 aromatic petroleum resin, a C5/C9 aliphatic/aromatic petroleum resin, a cycloaliphatic diene-based petroleum resin, or fully or partially hydrogenated form thereof; and
   a suspending fluid medium.

5. The composition of claim 1, wherein the suspending fluid medium comprises an alcohol or water.

6. The composition of claim 5, wherein the partitioning agent has solubility greater than 8 ppm in a hydrocarbon at a temperature of 0° C. or less.

7. The composition of claim 6, wherein the hydrocarbon is diesel.

8. A drag reducing composition, comprising:
   a drag reducing polymer;
   a partitioning agent comprising one or more of a coal-tar resin, a C5 aliphatic petroleum resin, a C9 aromatic petroleum resin, a C5/C9 aliphatic/aromatic petroleum resin, a cycloaliphatic diene-based petroleum resin, a terpene resin, a terpene phenol resin, a styrenated terpene resin, a rosin resin, one or more of an alkylphenol resin, or fully or partially hydrogenated form thereof, wherein the partitioning agent is a tackifier; and
   a suspending fluid medium.

9. A drag reducing composition, comprising:
   a drag reducing polymer;
   a partitioning agent comprising one or more of a coal-tar resin, a C5 aliphatic petroleum resin, a C9 aromatic petroleum resin, a C5/C9 aliphatic/aromatic petroleum resin, a cycloaliphatic diene-based petroleum resin, a rosin resin, one or more of an alkylphenol resin, or fully or partially hydrogenated form thereof, wherein the partitioning agent has a solubility greater than 8 ppm in a hydrocarbon stream at a temperature of 0° C. or less; and a suspending fluid medium.

10. A method of making a drag reducing composition, comprising:
forming a solid drag reducing polymer;
dividing the solid drag reducing polymer in the presence of a partitioning agent to form polymer particles that are in contact with the partitioning agent, wherein the partitioning agent comprises a tackifier and the tackifier is a hydrocarbon resin comprising one or more of a coal-tar resin, a C5 aliphatic petroleum resin, a C9 aromatic petroleum resin, a C5/C9 aliphatic/aromatic petroleum resin, a cycloaliphatic diene-based petroleum resin, or fully or partially hydrogenated form thereof; and
dispersing the polymer particles and the partitioning agent in a carrier fluid.

11. The method of claim 10, wherein forming the solid drag reducing polymer comprises bulk polymerization or solution polymerization.

12. The method of claim 10, wherein the hydrocarbon resin comprises monomers containing from 5 to 10 carbon atoms.

13. A method of making a drag reducing composition, comprising:
forming a solid drag reducing polymer;
dividing the solid drag reducing polymer in the presence of a partitioning agent to form polymer particles that are in contact with the partitioning agent, wherein the partitioning agent comprises one or more of a coal-tar resin, a C5 aliphatic petroleum resin, a C9 aromatic petroleum resin, C5/C9 aliphatic/aromatic petroleum resin, a cycloaliphatic diene-based petroleum resin, a terpene resin, a terpene phenol resin, a styrenated terpene resin, a rosin resin, one or more of an alkylphenol resin, or fully or partially hydrogenated form thereof, wherein the partitioning agent is a tackifier; and
dispersing the polymer particles and the partitioning agent in a carrier fluid.

14. A drag reducing composition, comprising:
a drag reducing polymer;
a partitioning agent comprising a xylene modified alkylphenol resin; and
a suspending fluid medium.

15. A drag reducing composition, comprising:
a drag reducing polymer;
a partitioning agent comprising a xylene modified alkylphenol resin, wherein the partitioning agent has a solubility greater than 8 ppm in a hydrocarbon stream at a temperature of 0° C. or less; and
a suspending fluid medium.

16. The composition of claim 8, wherein the partitioning agent comprises the rosin resin.

17. The composition of claim 16, wherein the rosin resin comprises at least one of gum rosin, wood rosin, and tall oil rosin.

18. The composition of claim 16, wherein the rosin resin is modified by one or more of esterification, hydrogenation, dimerization or functionalization.

19. The composition of claim 8, wherein the partitioning agent comprises at least one of the terpene resin, the terpene phenol resin, and the styrenated terpene resin.

20. The method of claim 13, wherein the partitioning agent comprises the rosin resin.

21. The method of claim 20, wherein the rosin resin comprises at least one of gum rosin, wood rosin, and tall oil rosin.

22. The method of claim 20, wherein the rosin resin is modified by one or more of esterification, hydrogenation, dimerization or functionalization.

23. The method of claim 13, wherein the partitioning agent comprises at least one of the terpene resin, the terpene phenol resin, and the styrenated terpene resin.

* * * * *